US010625461B2

(12) United States Patent
 Chauvin et al.

(10) Patent No.: US 10,625,461 B2
(45) Date of Patent: Apr. 21, 2020

(54) APPARATUS AND METHOD FOR FABRICATING CONTAINERS

(71) Applicant: DISCMA AG, Zurich (CH)

(72) Inventors: Guillaume Chauvin, Duchess Manor (SG); Christophe Collin, Fuveau (FR); Damien Kannengiesser, Golbey (FR); Jean-Tristan Outreman, Septemes les Vallons (FR); Jean-Louis Pellegatta, Seillons Source d'Argens (FR)

(73) Assignee: Discma AG, Zürich (CH)

( * ) Notice: Subject to any disclaimer, the term of this patent is extended or adjusted under 35 U.S.C. 154(b) by 628 days.

(21) Appl. No.: 14/889,708

(22) PCT Filed: May 6, 2014

(86) PCT No.: PCT/EP2014/059151
 § 371 (c)(1),
 (2) Date: Nov. 6, 2015

(87) PCT Pub. No.: WO2014/180803
 PCT Pub. Date: Nov. 13, 2014

(65) Prior Publication Data
 US 2016/0082646 A1    Mar. 24, 2016

(30) Foreign Application Priority Data
 May 7, 2013 (EP) .................................. 13166853

(51) Int. Cl.
 *B29C 49/60* (2006.01)
 *B29C 49/06* (2006.01)
 (Continued)

(52) U.S. Cl.
 CPC .............. *B29C 49/60* (2013.01); *B29C 49/06* (2013.01); *B29C 49/12* (2013.01); *B29C 49/46* (2013.01); *B29C 49/58* (2013.01); *B29C 2049/065* (2013.01); *B29C 2049/4664* (2013.01); *B29C 2049/5803* (2013.01); *B29C 2049/5893* (2013.01); *B29C 2049/6054* (2013.01);
 (Continued)

(58) Field of Classification Search
 None
 See application file for complete search history.

(56) References Cited

U.S. PATENT DOCUMENTS 5,340,302 A * 8/1994 Ingram ............... B29C 49/4205
                                                     425/528
6,273,705 B1 8/2001 Schoch
 (Continued)

FOREIGN PATENT DOCUMENTS

FR    2848905 A1    6/2004
JP    H07227902 A   8/1995

*Primary Examiner* — Monica A Huson
(74) *Attorney, Agent, or Firm* — Eric J. Sosenko; Jonathan P. O'Brien; Honigman LLP

(57) ABSTRACT

An injection head for a container fabricating machine. The fabricating machine includes a first nozzle configured to establish fluid communication between an injection liquid source and a preform cavity in communication with a mouth disposed at an open end of the preform. The first nozzle of the injection head includes a substantially tubular spout configured to be inserted into the open end of said preform and thereby create a seal with the preform.

17 Claims, 4 Drawing Sheets

(51) Int. Cl.
*B29C 49/12* (2006.01)
*B29C 49/46* (2006.01)
*B29C 49/58* (2006.01)
*B29L 31/00* (2006.01)
*B29K 67/00* (2006.01)
*B29K 105/00* (2006.01)

(52) U.S. Cl.
CPC .. *B29K 2067/003* (2013.01); *B29K 2105/258* (2013.01); *B29L 2031/7158* (2013.01)

(56) References Cited

U.S. PATENT DOCUMENTS

2009/0007315 A1   1/2009   Karon
2012/0315348 A1   12/2012  Wilson et al.

\* cited by examiner

APPARATUS AND METHOD FOR FABRICATING CONTAINERS

CROSS-REFERENCE TO RELATED APPLICATIONS

This application is the U.S. national phase of PCT Application No. PCT/EP2014/059151 filed on May 6, 2014, and claims priority to EP13166853.5 filed on May 7, 2013, the entire disclosures of which are herein incorporated by reference herein.

TECHNICAL FIELD

The invention relates to an apparatus for fabricating a container, notably by the method of blow molding. It also relates to a method for employing such an apparatus to fabricate a container.

BACKGROUND OF THE INVENTION

It is known to fabricate containers by blow molding, wherein a substantially tubular plastic parison commonly referred to as a "preform" is disposed in the cavity of a mold and expanded into the shape thereof by the injection of a pressurized fluid into said preform. This method lends itself well to the rapid fabrication of containers of consistently high quality.

A typical blow-molding apparatus comprises a mold, in which is provided a mold cavity in the form of the container to be produced. The preform is provided in a substantially tubular form globally resembling a test tube and which is disposed at least partially within the mold, conventionally being inserted into the mold cavity through a hole disposed in an upper surface of the mold.

Preferably, a small portion of the preform protrudes from the mold, permitting the attachment of an injection head to a mouth of the preform in communication with an internal cavity of the preform. This mouth portion of the preform is usually furnished with threads, rims, or other such means for interfacing with a closure device such as a cap, and remains substantially unchanged during the container forming process while the rest of the preform is expanded into a container. Generally, the preform is provided with a neck ring, which during the molding process sits upon the top surface of the mold and prevents the preform from falling through.

Optionally, the preform is heated prior to being inserted into the mold, to facilitate its deformation during the forming of the container.

The injection head is the means by which the molding apparatus interfaces with the preform, the injection head comprising a nozzle or other such channel configured to establish fluid communication between the mouth of the preform and a source of a pressurized fluid. During the operation of the apparatus, the pressurized fluid is injected into the cavity of the preform through the injection head, thereby inducing the preform to undergo plastic deformation and expand to assume the contours of the mold.

Since the fluid is injected at high pressure into the preform, it becomes necessary to provide a means in the nozzle of the injection head to create a secure seal with the preform, so as to avoid leakage of the pressurized fluid and subsequent malformations of the container due to the resultant loss of pressure.

Generally, this is accomplished by creating a seal between the nozzle and the top surface of the mold around the mouth of the preform. For example, the French patent application publication No 2 848 905 describes an injection head which is broadly bell-shaped, being configured to fit over the portion of the preform which protrudes from the mold. The injection head is pressed against the mold by mechanical, pneumatic, hydraulic, or magnetic means, creating a sealed chamber in communication with the cavity of the preform by way of the seal between its rim and the top surface of the mold surrounding the preform.

As initially conceived, the pressurized fluid injected into the preform is a gas, for instance compressed air. It has become known to inject a liquid into the preform, in particular the liquid which is ultimately to be packaged in the container thereby fabricated. This is advantageous relative to the former technique, in that it combines the steps for forming and filling the container and thereby realizes economies of space and time in the production of containers.

However, the injection nozzles known in the prior art are far from ideal for the injection of liquids. Specifically, the bell-shaped design of the nozzles known in the prior art, which seal to the top surface of the mold, will result in an amount of injection liquid being retained in the space above and around the preform within the injection nozzle. This liquid will leak from the injection nozzle when the seal between it and the mold is broken, and infiltrate the mold cavity when the mold is opened to remove the finished container. The presence of the liquid within the mold cavity will cause malformations of the container in subsequent container forming cycles of the apparatus, hinder the attachment of labels or other markings to the container, and may implicate cleanliness concerns if the injection liquid contains alimentary substances such as oils or sugars. Such systems require the use of cleaning and/or drying systems to clean the mold cavity and the container after the conclusion of the forming process, adding expense to the forming process and slowing the rate at which containers may be formed and filled.

It is therefore an object of the invention to provide an injection nozzle for a blow molding apparatus which resolves the disadvantages of the prior art as detailed above.

SUMMARY OF THE INVENTION

In a first aspect of the invention there is provided an injection head for a container-fabricating apparatus, comprising a first nozzle configured to establish fluid communication between an injection liquid source and a preform cavity of a substantially tubular preform, said preform cavity being in communication with a mouth disposed at an open end of said preform.

According to the invention, said first nozzle comprises a substantially tubular spout configured to be inserted into said open end of said preform and create a seal therewith.

This is advantageous in that an injection head so configured will create a seal with the preform that does not circulate the injection liquid about the exterior of the preform during the forming of the container as in the prior art. When the injection head is retracted from the container and the seal broken between the first nozzle and the mouth of the preform, there will be no liquid disposed about the mouth of the preform to leak out and contaminate the mold.

Additionally, thanks to the disposition of the tubular spout within the open end of the preform, the invention is further advantageous in that the amount of plastic used in the preform is reduced. Specifically, the tubular spout will resist the pressure of the injection fluid during the forming of the container, enabling one to reduce the thickness of the preform at its open end which would have otherwise been necessary to prevent the open end from deforming. The reduction of weight in the preform this permits will reduce the cost of providing the preform, particularly advantageous in a high-volume industrial-scale implementation of such an injection head.

In a possible embodiment, the tubular spout is configured to abut a shoulder provided in an interior surface of the preform when inserted into the open end thereof.

This is advantageous in that the provision of such a shoulder will increase the surface area over which the tubular spout-preform seal is created, thereby augmenting its strength. Furthermore, the shoulder will provide an opposing surface against which the end of the tubular spout will bear when the nozzle is inserted into the preform, permitting one to press the preform and tubular spout together to achieve an even further augmented strength of seal between the two. This enables the user to inject the injection liquid at higher pressures, improving the flexibility and capabilities of the container fabricating machine incorporating such an injection head.

In a preferred embodiment of the invention, the first nozzle comprises an annular mouth seal disposed about the tubular spout, said mouth seal being urged against the mouth of the preform and creating a seal therewith when said tubular spout is inserted into the open end of said preform.

This is advantageous in that the provision of an elastic sealing ring will reinforce the seal between the injection head and the preform when the two are put in fluid communication with each other. The improved sealing between the two permits the injection of the injection liquid at higher pressures than would be achievable without an elastic sealing ring in the first nozzle. This results in an expanded range of configurations of containers which may be produced by a container fabricating machine incorporating an injection head according to the present invention.

In a practical embodiment, where the preform further comprises a neck ring disposed about the open end thereof at a distance from the mouth of said preform; the injection head is further characterized in that it comprises a second nozzle extending from and communicating with said first nozzle, said second nozzle comprising a substantially cylindrical nozzle cavity having an internal diameter greater than the internal diameter of said first nozzle, said nozzle cavity being bounded at a proximal end by said first nozzle and at a distal end by an annular shoulder seal defining an internal circumference of said nozzle cavity, such that said shoulder seal of said second nozzle creates a seal with a neck ring of the preform when said first nozzle is disposed in contact with the mouth of said preform.

This is advantageous in that the provision of the second nozzle with the shoulder seal adds a redundant sealing element that will minimize the leakage of fluid in the injection head should the seal between the tubular spout and the preform fail during forming. This reduces the spillage of product in the event of such a seal failure, and any resultant malformation or underfilling of the containers.

Preferably, the injection head further comprises a channel establishing fluid communication between the nozzle cavity and a source of pressurized compensation fluid.

This is advantageous in that the portion of the nozzle cavity disposed between the first and second nozzles and the preform will be pressurized by the compensation fluid, counteracting the pressure exerted by the pressurized injection liquid in the preform cavity during the fabrication of a container. This enables one to reduce the thickness of the walls of the preform at the open end thereof, thereby reducing the weight of the preform and the expense of its fabrication.

In a practical embodiment, the injection head further comprises a stretching rod configured to bear upon an internal surface of the preform so as to induce said preform to deform along a longitudinal axis thereof.

This is advantageous in that an injection head incorporating a stretching rod will exercise an increased degree of control over the deformation of the preform as it is formed into a container. Specifically, the advancing of the stretching rod into the preform will accelerate the deformation of the preform along its longitudinal axis, permitting the fabrication of a greater range of shapes and volumes of container than would be possible without a stretching rod.

In another practical embodiment, the injection head further comprises an injection valve configured to selectively block fluid communication between said fluid source and said preform cavity.

This is advantageous in that it achieves a reduction in the dead volume in the injection head to that which is disposed between the injection valve and the first nozzle, improving the control the user may exercise over the volume of injection liquid injected into the preform during the forming of a container.

In a second aspect of the invention there is provided a container-fabricating ensemble comprising a substantially tubular preform comprising a preform cavity in communication with a mouth disposed at an open end of said preform and a neck ring disposed at said open end at a distance from said mouth; and at least one injection head as described above.

This is advantageous in that such an ensemble will produce a formed container from the preform, thereby embodying the advantages of the invention.

In a third aspect of the invention there is provided a method for fabricating a container comprising the steps of providing a substantially tubular preform comprising a preform cavity in communication with a mouth disposed at an open end of said preform; disposing said preform in a mold having a mold cavity substantially in the form of a container; positioning an injection head in fluid communication with said preform, said injection head comprising a first nozzle configured to establish fluid communication between an injection liquid source and said preform cavity of said preform, said first nozzle comprising a substantially tubular spout inserted into said open end of said preform and creating a seal therewith; and injecting an injection liquid from said injection liquid source through said injection head into the preform cavity of said preform, said preform being thereby induced to expand into the shape of said mold cavity.

This is advantageous in that such a method will form and fill containers in a way that will greatly reduce or eliminate the leakage and spilling of the injection liquid from the preform. Specifically, since a seal is created directly between the injection head and the preform, there is no injection liquid which remains in the area around the open end of the preform once the container is formed, as occurs in the prior art. This eliminates the possibility of injection liquid infiltrating the mold cavity and the resultant complications in the molding of subsequent containers.

In a possible embodiment, the preform is provided with a shoulder in an interior surface thereof, the tubular spout abutting against said shoulder of said preform when inserted into the open end thereof during the positioning step.

This is advantageous in that such an engagement between the preform and injection head will produce a seal between the two of improved quality, as discussed above.

In a preferred embodiment, said injection head further comprises an annular mouth seal disposed about the tubular spout, said mouth seal being urged against the mouth of the preform during the positioning step and creating a seal therewith.

This is advantageous in that the elastic sealing ring increases the maximum pressure at which the injection liquid may be injected during the injecting step, realizing the advantages enumerated above.

In another preferred embodiment, the preform further comprises a neck ring disposed about an open end of said preform at a distance from the mouth; and the injection head further comprises a second nozzle extending from and communicating with the first nozzle, said second nozzle comprising a substantially cylindrical nozzle cavity having an internal diameter greater than the internal diameter of said first nozzle and bounded at a proximal end by said first nozzle and at a distal end by an annular shoulder seal defining an internal circumference of said nozzle cavity, such that during the positioning step said shoulder seal is disposed in contact with the neck ring of said preform and creates a seal therewith.

This is advantageous in that the provision of the second nozzle with the shoulder seal adds a redundant sealing element that will minimize the leakage of fluid in the injection head should the first resilient sealing ring fail during operation.

Preferably, during the injecting step a compensation fluid is injected into the nozzle cavity through a channel provided in the injection head establishing communication between said nozzle cavity and a source of pressurized compensation fluid.

Most preferably, the compensation fluid is injected into the nozzle cavity at substantially the same pressure as the pressure at which the injection liquid is injected into the preform cavity of the preform during the injecting step.

This is advantageous in that the portion of the nozzle cavity disposed between the first and second nozzles and the preform will be pressurized by the compensation fluid, counteracting the pressure exerted by the pressurized injection liquid in the preform cavity during the injecting step. This counteracting permits one to provide the preform with thinner walls than would otherwise be possible, reducing the weight and cost of each preform. Injecting the compensation fluid at a pressure substantially equal to the injection liquid will realize this effect to the greatest degree.

In a preferred embodiment, the compensation fluid is compressed air.

This is advantageous in that compressed air is generally simple to furnish, even in a high-volume supply. Compressed air may also be sterilized and provided in a sterile form without difficulty, making it particularly advantageous where the container being fabricated is to contain an alimentary substance.

DETAILED DESCRIPTION

For a complete understanding of the present invention and the advantages thereof, reference is made to the following detailed description of the invention.

It should be appreciated that various embodiments of the present invention can be combined with other embodiments of the invention and are merely illustrative of the specific ways to make and use the invention and do not limit the scope of the invention when taken into consideration with the claims and the following detailed description.

In the present description, the following words are given a definition that should be taken into account when reading and interpreting the description, examples and claims.

"Injection Liquid" is a non-compressible liquid substance injected under pressure into said preform during a process for the forming of the latter so as to induce said preform to plastically deform;

A "Neck Ring" is a flattened annular projection disposed upon the surface of the preform, serving to separate the neck of the preform, proximal to its mouth, from a body of the preform distal from its mouth; and "Preform" is a substantially tubular object fabricated from a thermoplastic resin and configured to interface with an apparatus for molding it into a container.

As used in this specification, the words "comprises", "comprising", and similar words, are not to be interpreted in an exclusive or exhaustive sense. In other words, they are intended to mean "including, but not limited to."

Any reference to prior art documents in this specification is not to be considered an admission that such prior art is widely known or forms part of the common general knowledge in the field.

The invention is further described with reference to the following examples. It will be appreciated that the invention as claimed is not intended to be limited in any way by these examples.

The main principle of the invention is first described.

Figure 1:
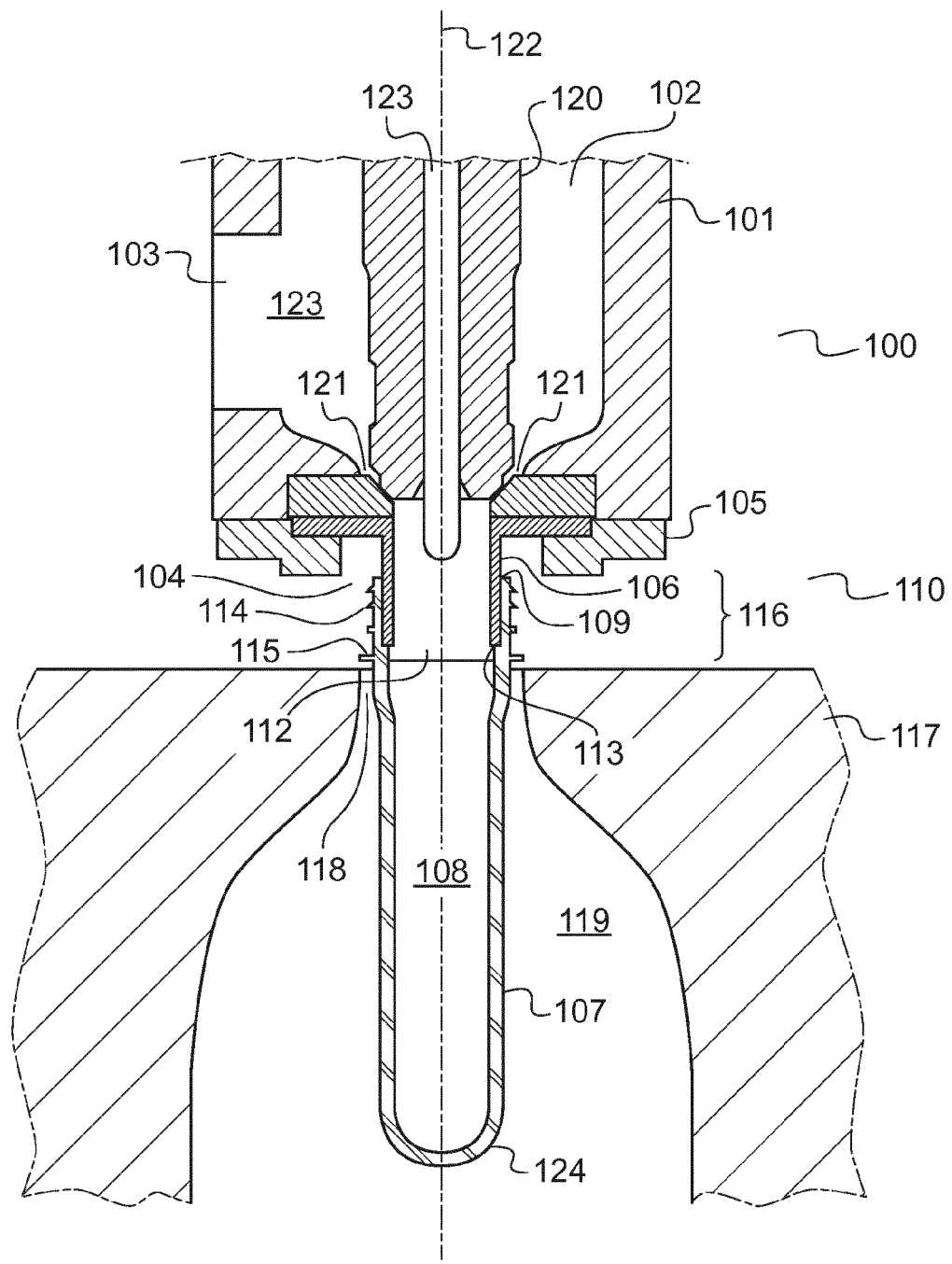
FIG. 1 is a lateral cross-section view of an injection head according to a first embodiment of the invention.

FIG. 1 is a lateral cross-section of an injection head according to a first embodiment of the invention. The injection head 100 comprises a body 101 defining an internal cavity 102. The internal cavity 102 communicates with an injection liquid port 103 at one extremity of its circulation, and with the first nozzle 104 at another extremity.

The first nozzle 104 consists of a nozzle plate 105, which retains the tubular spout 106 in place in the first nozzle 104. Alternately, the nozzle plate 105 may be provided as an integral portion of the body 101, with other means for retaining the tubular spout 106 in place.

The injection head 100 is configured to be disposed upon a preform 10 and create a seal therewith. The preform 107 is substantially tube-shaped, as shown here, enclosing a preform cavity 108 which communicates with the mouth 109 at an open end 110 of the preform 107.

The preform 107 is provided at its open end 110 a counterbored throat 112 having an increased internal diameter relative to the rest of the preform 107 and bounded by the mouth 109 and a shoulder 113. In this embodiment, the throat 112 has straight sides, forming a counterbore in the open end 110 of the preform 107.

In other embodiments it may be advantageous to furnish the open end of the preform in other configurations, for instance with a standard taper- or ball-and-socket-type joint similar to those employed in chemical laboratory glassware and the like.

The preform 107 is preferably fabricated from polyethylene terephthalate (PET) resin, as it generally molds easily and has an advantageous strength to weight ratio.

However, other plastic resins such as low-, medium-, or high-density polyethylene (L/M/HDPE), polypropylene (PP), and the like may equally be employed, depending on the particular characteristics of the container to be fabricated and the substance to be contained therein.

The preform 107 is, in this embodiment, fabricated by injection molding, which produces preforms of uniformly-high quality in a manner well-suited for industrial-scale production. However, other methods of production, such as extrusion, may possibly be employed in other embodiments.

The preform 107 is provided with threads 114 at the open end 110. The threads 114 are formed when the preform 107 is fabricated and remain substantially unchanged during the forming of the container, being thereafter used to engage a cap or other closure device to effectuate the sealing of the container.

The preform 107 is also provided with a neck ring 115. An open end region 116 of the open end 110 of the preform 107 between the mouth 109 and the neck ring 115 is thereby delineated, which comprises the walls of the preform 107 and the threads 114.

The preform 107 is inserted into the mold 117 through the mold orifice 118, being held in place by the neck ring 115 which rests on the surface of the mold 115. The preform 107 is thereby substantially disposed within the mold cavity 119 within the mold 117, which is substantially in the shape of the container to be fabricated. While not depicted here for the sake of simplicity, the mold 117 is provided in several segments, to permit the extraction of the finished container once the fabrication process is completed.

In this embodiment, the injection head 100 is further provided with an injection valve 120, which is configured to seat in the valve seats 121 disposed in the body 101 of the injection head 100. The seating of the injection valve 120 in valve seats 121 will block off the tubular spout 106; the injection valve 120 is thereby made mobile along the longitudinal axis 122, so as to selectively permit flow from the injection liquid port 103 to the tubular spout 106 and into the mouth 109 of the preform 107.

Preferably, the injection valve 120 and valve seats 121 are hardened to provide improved sealing and wear characteristics. The valve seats 121 are preferably provided as distinct components, as shown here, to facilitate their refurbishment or replacement during any servicing of the injection head 100.

In this embodiment, the injection head further comprises a stretching rod 123, disposed coaxially with the tubular spout 106 and the injection valve 120 about the longitudinal axis 122. The stretching rod 123 is translatably mobile along the longitudinal axis 122 relative to both the tubular spout 106 and the injection valve 120. During the forming of the container, the stretching rod is advanced into the preform cavity 108 of the preform 107 into contact with the distal end 124 thereof, being pressed into it so as to induce it to deform along the longitudinal axis 122.

When the injection head 100 is positioned upon the preform 107, the tubular spout 106 is inserted into the throat 112 into abutment with the shoulder 113. The tubular spout 106 lodges in the throat 112 to create a seal therewith, ensuring a pressure-tight connection between the injection head 100 and the preform 107 during formation of the latter into a container. Depending on the particulars of the preform 107 and of the container into which it is to be formed, it may also be necessary to press the injection head 106 into the preform 107.

Once the injection head 100 is positioned, the injection valve 120 is retracted from the valve seats 121 and fluid communication is established between the injection liquid port 103 and the preform cavity 108. The injection liquid port 103 is in communication with a pressurized injection liquid source (not shown), from which a volume of injection liquid 125 is conducted into the preform cavity 108 to expand the preform 107 into the mold cavity 119 and form a container.

Figure 2:
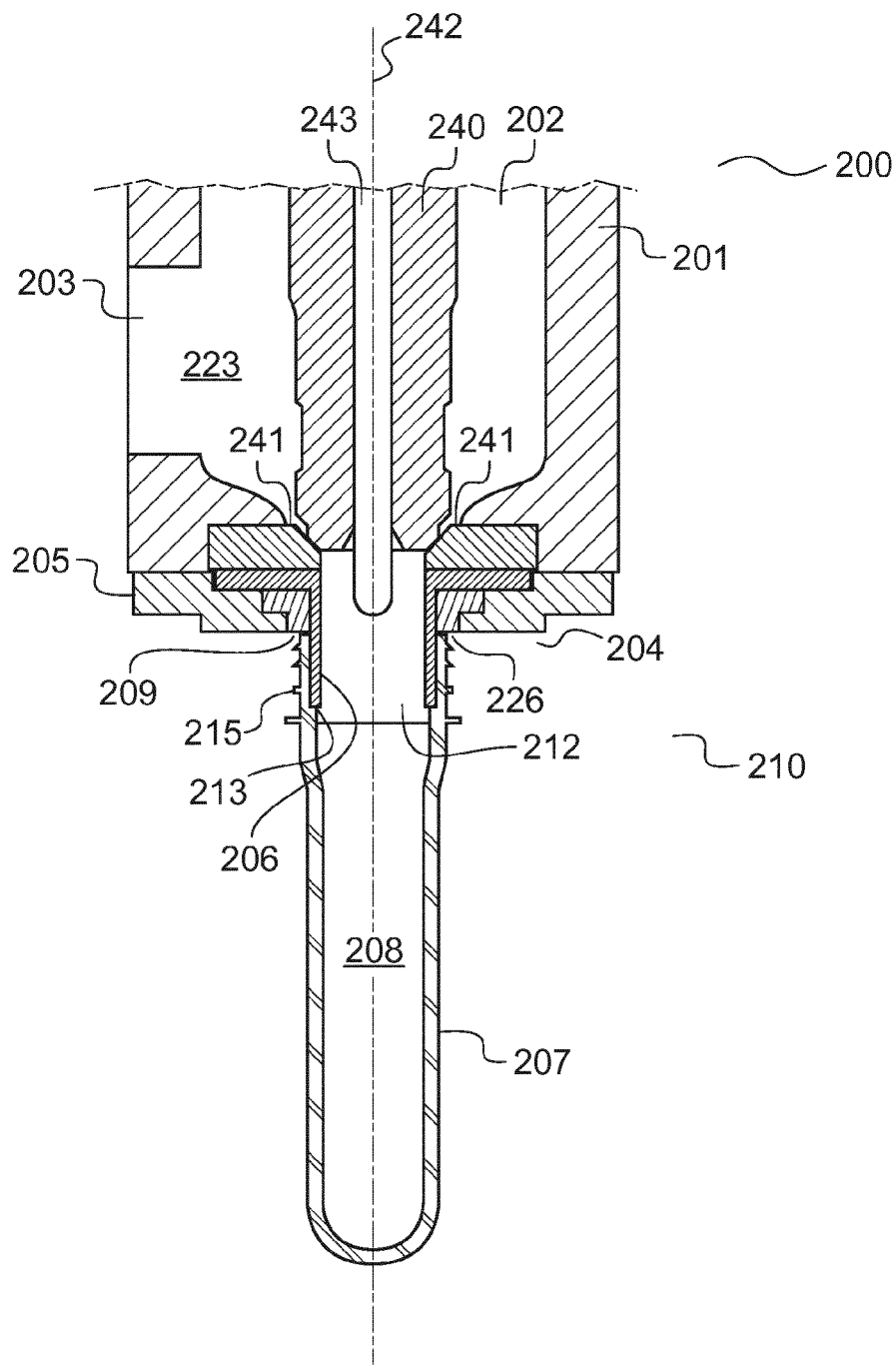
FIG. 2 is a lateral cross-section view of an injection head according to a second embodiment of the invention.

FIG. 2 is a lateral cross-section of an injection head 200 according to a second embodiment of the invention. The injection head 200 is similar to the injection head 100 presented in the previous Figure, in that it comprises a body 201 defining an internal cavity 202. The internal cavity 202 communicates with an injection liquid port 203 at one extremity of its circulation, the injection liquid port being in communication with an injection liquid source (not shown). At the other end of its circulation, a first nozzle 204 comprises a nozzle plate 205, which retains a tubular spout 206 in position as shown. A mold is generally present during use of the injection head 200 as in FIG. 1, but is omitted here and in subsequent Figures for purposes of clarity.

The injection head 200 is configured to mate with a preform 207 which comprises a preform cavity 208 communicating with a mouth 209 at an open end 210, said open end 210 further comprising a neck ring 215 disposed about the preform 207. As in the first embodiment of FIG. 1, the preform 207 is provided at the open end 210 a counterbored throat 212 having a shoulder 213. When the tubular spout 206 is inserted into the preform 207 a seal is created between the two.

In this embodiment, the injection head 200 also comprises a mouth seal 226 disposed about the tubular spout 206. The mouth seal 226 is positioned such that when the tubular spout 206 is inserted into the counterbored throat 212 of the preform 207, the mouth 209 of the preform 207 bears against the mouth seal and creates a seal therewith.

In this way, the injection fluid 223 is prevented from leaking from the joint between the injection head 200 and preform 207 during the forming of a container.

In this embodiment, the mouth seal 226 is retained in place by the nozzle plate 205; specifically, the lip 226A of the mouth seal 226 is sandwiched between the nozzle plate 205 and the body 201 of the injection head 200. The precise configuration of the mouth seal may be determined by the user as appropriate for each individual application.

The mouth seal is fabricated from a resilient, food-grade material, for instance silicone rubber, fluoroelastomer (e.g. Viton™), or wax; the exact material and properties of the mouth seal 226 will vary with from application according to inter alia the chemical properties of the injection liquid employed and the temperature and pressure at which it is injected.

In this embodiment, the injection head 200 is furnished with an injection valve 240, which when disposed in a closed position as shown abuts the valve seats 241 so as to block fluid communication between the injection liquid port 203 and the preform cavity 208 of the preform 207.

There is further provided a stretching rod 243. During the fabrication of a container, the injection valve 240 will be retracted from the valve seats 241 and the stretching rod advanced along the longitudinal axis 242 into the preform 207, eventually contacting the interior surface of said preform 207 and inducing it to stretch along the longitudinal axis 242. In this way, both the longitudinal and radial expansion of the preform 207 during the fabrication of a container are controlled.

Figure 3:
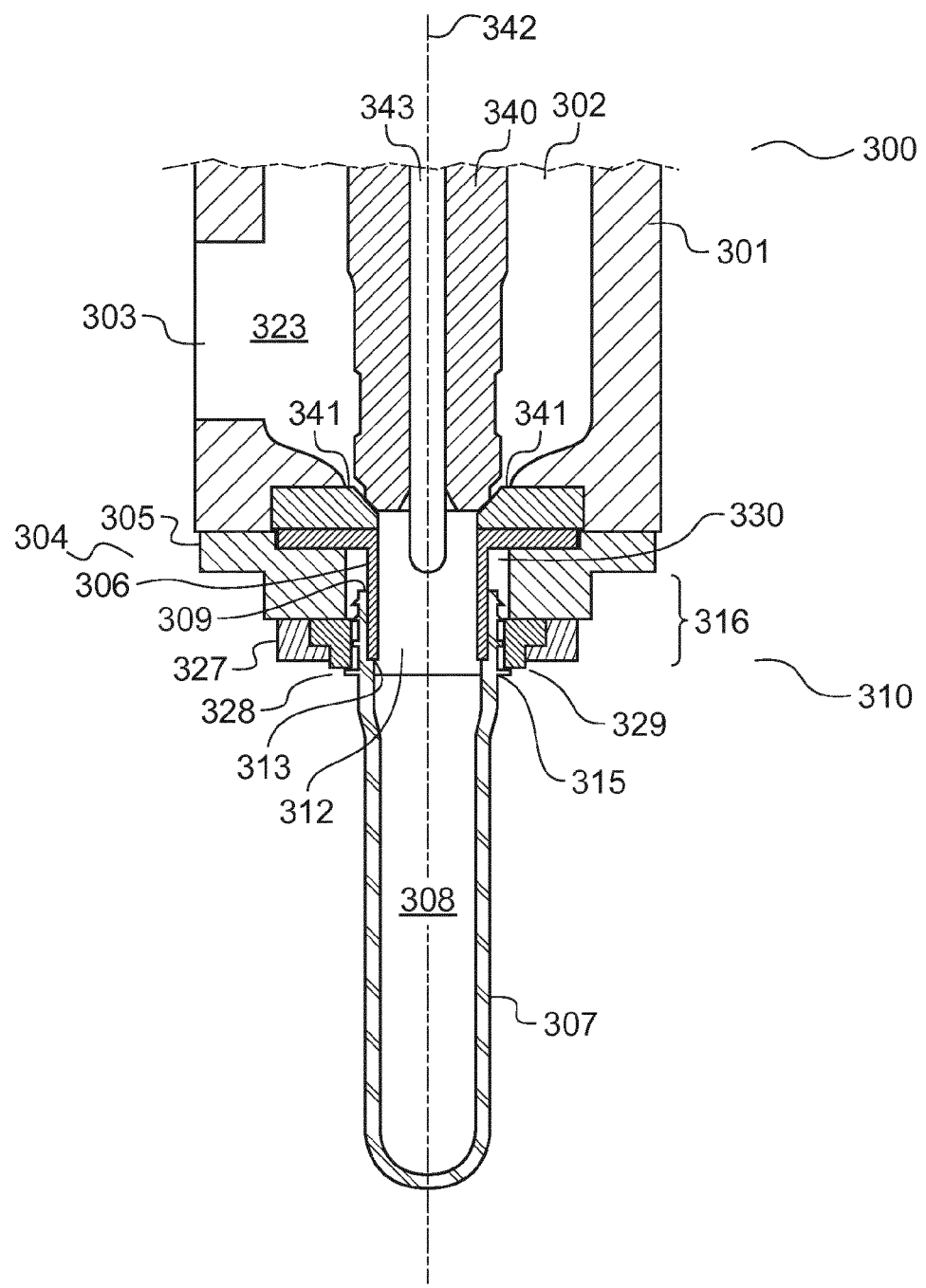
FIG. 3 is a lateral cross-section view of an injection head according to a third embodiment of the invention.

FIG. 3 is a lateral cross-section of an injection head 300 according to a third embodiment of the invention, comprising as in FIGS. 1 and 2 a body 301 defining an internal cavity 302. The internal cavity 302 is in communication with an injection liquid port 303 and a first nozzle 304 comprising a nozzle plate 305, which retains a tubular spout 306.

As in FIGS. 1 and 2, the injection head 300 is configured to engage a preform 307 having a preform cavity 308 in communication with a mouth 309 at an open end 310 of said preform 307, as depicted here. The tubular spout 306 is inserted into a counterbored throat 312 disposed in the open end 310 having a shoulder 313 against which the tubular spout 306 is brought into abutment. When the tubular spout 306 is disposed within the counterbored throat 312 as shown here, a seal is created between the two.

The preform 307 further comprises a neck ring 315 disposed about the preform at the open end 310. The portion of the preform 307 between the neck ring 315 and the mouth 309 is the open end region 316.

In this way, the injection fluid 323 is prevented from leaking from the joint between the injection head 300 and preform 307 during the forming of a container.

In this embodiment, the injection head 300 is provided with a second nozzle plate 327, which in conjunction with the first nozzle plate 305 defines a second nozzle 328. In the second nozzle 328 is provided a shoulder seal 329, configured to bear upon the neck ring 315 when the injection head 300 is disposed upon the preform 307. As shown here, when the tubular spout 306 is abutted against the shoulder 316 of the counterbored throat 312 of the preform 307, the shoulder seal 329 bears upon the neck ring 315 and creates a seal therewith.

Within the second nozzle 328 and the shoulder seal 329 is the nozzle cavity 330, which is a substantially cylindrical, ordinarily communicating with the tubular spout 306 and delineated by the first and second nozzle plates 305 & 327. When the injection head 300 is disposed upon the preform 307, the preform 307 projects into the nozzle cavity 330, thereby cutting off circulation between the tubular spout 306 and the portion of the nozzle cavity 330 outside the preform 307. The effective volume of the nozzle cavity 330 is thereby reduced to the space defined by the first and second nozzle plates 305 & 3027, the tubular spout 306, and the preform 307.

Should the seal between the tubular spout 306 and the preform 307 fail or be otherwise insufficient to withstand the pressure of the container fabrication process, any leakage will be retained in the nozzle cavity 330 by virtue of the seal created between the neck ring 315 and the shoulder seal 329.

Furthermore, as in the previous embodiments the injection head 300 is furnished with an injection valve 340, which when disposed in a closed position as shown abuts the valve seats 341 so as to block fluid communication between the injection liquid port 303 and the preform cavity 308 of the preform 307.

There is further provided a stretching rod 343. During the fabrication of a container, the injection valve 340 will be retracted from the valve seats 341 and the stretching rod advanced along the longitudinal axis 342 into the preform 307, eventually contacting the interior surface of said preform 307 and inducing it to stretch along the longitudinal axis 342. In this way, both the longitudinal and radial expansion of the preform 307 during the fabrication of a container are controlled.

Figure 4:
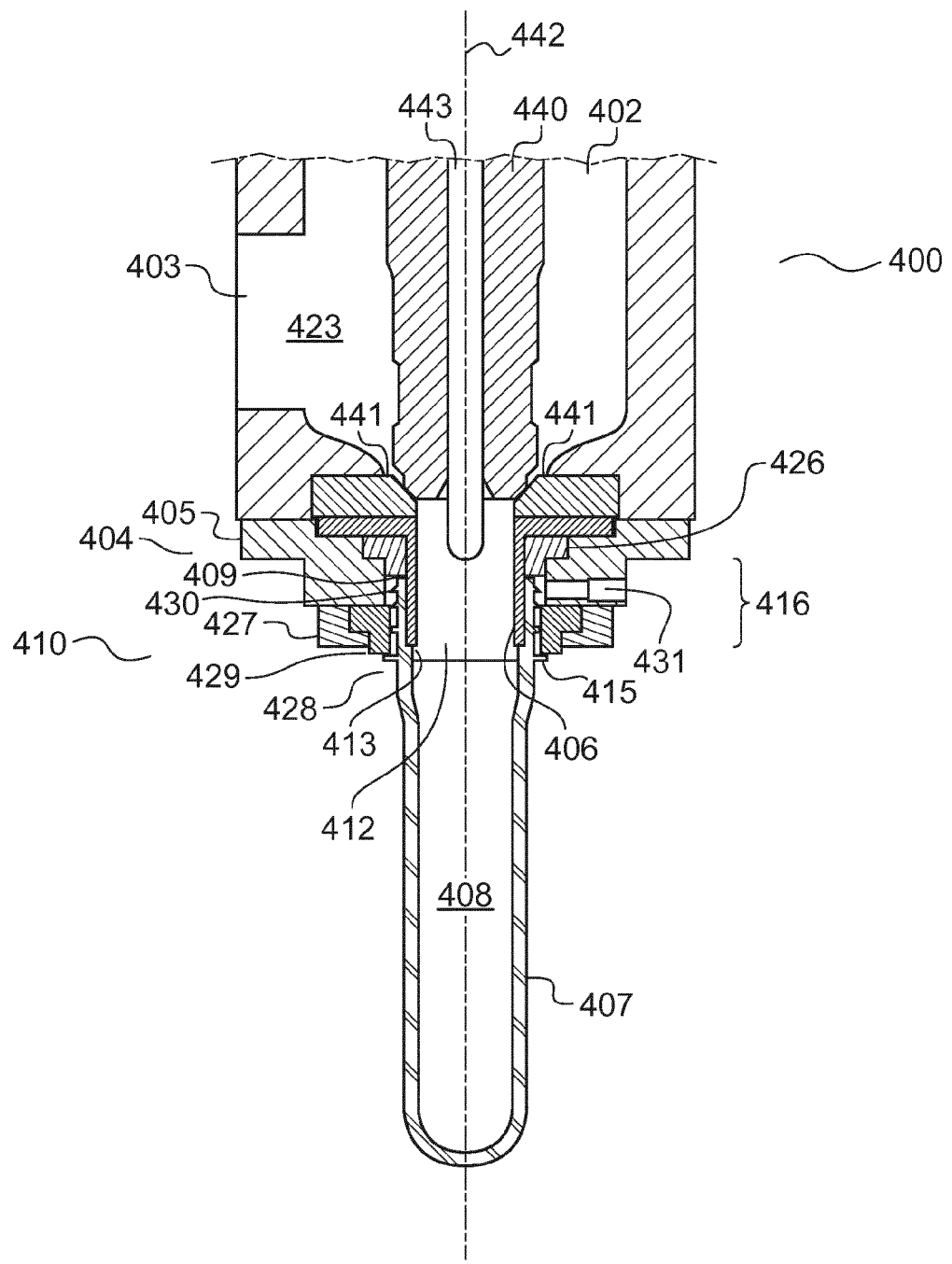
FIG. 4 is a lateral cross-section view of an injection head according to a fourth embodiment of the invention.

FIG. 4 is a lateral cross-section of an injection head 400 according to a fourth embodiment of the invention. As with the three previous embodiments, the injection head 400 of this embodiment comprises a body 401 defining an internal cavity 402 communicating with an injection liquid port 403, and a first nozzle 404 comprising a nozzle plate 405. As in the previous embodiments, the nozzle plate 405 retains a tubular spout 406 in position, the tubular spout 406 being thereby in fluid communication with said internal cavity 402.

As in the third embodiment discussed in FIG. 3, there is provided a preform 407 defining a preform cavity 408 and having a mouth 409 in communication with said preform cavity 408 and disposed at an open end 410 of the preform 407. The preform 407, as in the previous embodiments, has at the open end 410 a counterbored throat 412 into which the tubular spout 406 is inserted, said tubular spout 406 being advanced into the counterbored throat 412 and into abutment with a shoulder 413 so as to create a seal with the preform 407. The open end region 416 of the preform 407 is thereby delimited by the mouth 409 and the neck ring 415.

In this embodiment, there is provided about the tubular spout a mouth seal 426, which, when the injection head 400 is disposed in fluid communication with the preform 407 as shown here, bears upon the mouth 409 of the preform 407 and creates a seal therewith.

Furthermore, in this embodiment the injection head 400 is provided with a second nozzle plate 427, which in conjunction with the first nozzle plate 405 defines a second nozzle 428. The second nozzle plate 427 comprises a shoulder seal 429 disposed so as to bear upon the neck ring 415 of the preform 407 and create a seal therewith.

During the forming of a container, the injection fluid 423 injected into the cavity 408 of the preform 407 is thereby prevented from leaking.

As in the third embodiment depicted in FIG. 3, the second nozzle plate 427 and shoulder seal 429 define the nozzle cavity 430, which is substantially cylindrical and in communication with the tubular spout 406. When the injection head 400 is disposed on the preform 407 as shown here, the mouth 409 of the preform 407 seals against the mouth seal 426 and the shoulder seal 429 seals against the neck ring 415. This cuts off communication between the tubular spout 406 and the portion of the nozzle cavity 330 situated outside the preform 407. The effective volume of the nozzle cavity 330 is thereby reduced to the space defined by the first and second nozzle plates 405 & 427, the mouth seal 426, the shoulder seal 429, and the preform 407.

Furthermore, in this embodiment the injection head 400 is provided with a compensation fluid channel 431, which communicates with the nozzle cavity 430. The compensation fluid channel 431 is in communication with a source (not shown) of a compensation fluid.

During the forming of a container from the preform 407, the compensation fluid is injected into the nozzle cavity 430, pressurizing the portion of the nozzle cavity 430 which lies between the preform 407 and the components of the injection head 400, as described above. Preferably, the compensation fluid injected into the nozzle cavity 430 is compressed air.

In this embodiment it is envisioned that the compensation fluid is sterile, pressurized air, furnished by a compressor or similar means. Of course, in other embodiments it is possible to utilize other fluids as appropriate to the situation. For instance, gases such as carbon dioxide, nitrogen, or argon may be employed; or alternately it may in non-alimentary applications be more efficient to utilize a fast-evaporating liquid such as alcohol.

The injection of the compensation fluid into the nozzle cavity 430 will offset the pressure difference across the wall of the preform 407 at the open end region 416 by the injection of the injection liquid 423 into the preform cavity 408. Preferably, the pressure of the compensation fluid within the nozzle cavity 430 is substantially equal to that of the injection liquid 423 being injected.

Finally, as in the previous three embodiments the injection head 400 is furnished with an injection valve 440, which when disposed in a closed position as shown abuts the valve seats 441 so as to block fluid communication between the injection liquid port 403 and the preform cavity 408 of the preform 407.

There is further provided a stretching rod 443. During the fabrication of a container, the injection valve 440 will be retracted from the valve seats 441 and the stretching rod advanced along the longitudinal axis 442 into the preform 407, eventually contacting the interior surface of said preform 407 and inducing it to stretch along the longitudinal axis 442. In this way, both the longitudinal and radial expansion of the preform 407 during the fabrication of a container are controlled.

Although the invention has been described by way of example, it should be appreciated that variations and modifications may be made without departing from the scope of the invention as defined in the claims. Furthermore, where known equivalents exist to specific features, such equivalents are incorporated as if specifically referred in this specification.

The invention claimed is:

1. An injection head for a container fabricating machine, comprising a first nozzle configured to establish fluid communication between an injection liquid source and a preform cavity of a substantially tubular preform, said preform cavity being in communication with a mouth defined by portions of said preform disposed at an open end of said preform, said first nozzle having a substantially tubular spout configured to be inserted into said open end of said preform and create a circumferential and axial seal therewith, the axial seal of the tubular spout having a sealing length greater than a width of the portions defining the mouth of said preform.

2. An injection head for a container fabricating machine, comprising a first nozzle configured to establish fluid communication between an injection liquid source and a preform cavity of a substantially tubular preform, said preform cavity being in communication with a mouth disposed at an open end of said preform, wherein said first nozzle further comprises a substantially tubular spout configured to be inserted into said open end of said preform and create a seal therewith, wherein the preform further comprises a neck ring disposed about the open end thereof at a distance from the mouth, the injection head being further characterized in that it comprises a second nozzle extending from and communicating with said first nozzle, said second nozzle comprising a substantially cylindrical nozzle cavity having an internal diameter greater than the internal diameter of said first nozzle, said nozzle cavity being bounded at a proximal end by said first nozzle and at a distal end by an annular shoulder seal defining an internal circumference of said nozzle cavity, such that said shoulder seal of said second nozzle creates a seal with a neck ring of the preform when said first nozzle is disposed in contact with the mouth of said preform.

3. The injection head as claimed in claim 2, further comprising a channel establishing fluid communication between the nozzle cavity and a source of pressurized compensation fluid.

4. The injection head as claimed in claim 1, wherein said injection head further comprises a stretching rod configured to bear upon an internal surface of the preform so as to induce said preform to deform along a longitudinal axis thereof.

5. The injection head as claimed in claim 1, wherein it further comprises an injection valve configured to selectively block fluid communication between said fluid source and said preform cavity.

6. A container-fabricating ensemble comprising a substantially tubular preform comprising a preform cavity in communication with a mouth disposed at an open end of said preform and a neck ring disposed at said open end at a distance from said mouth; and at least one injection head as claimed in claim 1.

7. A method for fabricating a container comprising the steps of:
providing a substantially tubular preform comprising a preform cavity in communication with a mouth defined by portions of said preform disposed at an open end of said preform;
disposing said preform in a mold having a mold cavity substantially in the form of a container;
positioning an injection head in fluid communication with said preform, said injection head comprising a first nozzle configured to establish fluid communication between an injection liquid source and said preform cavity of said preform, said first nozzle comprising a substantially tubular spout inserted into said open end of said preform and creating a circumferential and axial seal therewith, the axial seal of the tubular spout having a sealing length greater than a width of the portions defining the mouth of said preform; and
injecting an injection liquid from said injection liquid source through said injection head into the preform cavity of said preform, said preform being thereby induced to expand into the shape of said mold cavity.

8. A method for fabricating a container comprising the steps of:
providing a substantially tubular preform comprising a preform cavity in communication with a mouth disposed at an open end of said preform;
disposing said preform in a mold having a mold cavity substantially in the form of a container;
positioning an injection head in fluid communication with said preform, said injection head comprising a first nozzle configured to establish fluid communication between an injection liquid source and said preform cavity of said preform, said first nozzle comprising a substantially tubular spout inserted into said open end of said preform and creating a seal therewith;
injecting an injection liquid from said injection liquid source through said injection head into the preform cavity of said preform, said preform being thereby induced to expand into the shape of said mold cavity; and
wherein the preform is provided with a shoulder in an interior surface thereof, and further comprising the step of abutting the tubular spout against said shoulder of said preform when inserted into the open end thereof during the positioning step.

9. The method as claimed in claim 7, wherein said injection head further comprises an elastic sealing ring disposed about the tubular spout, and further comprising the step of urging said elastic sealing ring against the mouth of the preform during the positioning step and creating a seal therewith.

10. The method as claimed in claim 7, wherein the preform further comprises a neck ring disposed about an open end of said preform at a distance from the mouth, and wherein the injection head further comprises a second nozzle extending from and communicating with the first nozzle, said second nozzle comprising a substantially cylindrical nozzle cavity having an internal diameter greater than the internal diameter of said first nozzle and bounded at a proximal end by said first nozzle and at a distal end by an annular shoulder seal defining an internal circumference of said nozzle cavity, and further comprising the step of disposing the shoulder seal in contact with the neck ring of said preform during the positioning step and creating a seal therewith.

11. The method as claimed in claim 10, further comprising, during the injecting step, injecting a compensation fluid into the nozzle cavity through a channel provided in the injection head establishing fluid communication between said nozzle cavity and a source of pressurized compensation fluid.

12. The method as claimed in claim 11, wherein said compensation fluid is injected into the nozzle cavity at substantially the same pressure as the pressure at which the injection liquid is injected into the preform cavity of the preform during the injecting step.

13. The method as claimed in claim 11, wherein said compensation fluid is compressed air.

14. An injection head for a container fabricating machine, comprising a first nozzle configured to establish fluid communication between an injection liquid source and a preform cavity of a substantially tubular preform, said preform cavity being in communication with a mouth disposed at an open end of said preform, wherein said first nozzle further comprises a substantially tubular spout configured to be inserted into said open end of said preform and create a seal therewith, the first nozzle further comprises an annular mouth seal disposed about the tubular spout, said mouth seal being urged against the mouth of the preform and creating a seal therewith when said tubular spout is inserted into the open end of said preform.

15. The injection head as claimed in claim 12, wherein the preform further comprises a neck ring disposed about the open end thereof at a distance from the mouth, the injection head being further characterized in that it comprises a second nozzle extending from and communicating with said first nozzle, said second nozzle comprising a substantially cylindrical nozzle cavity having an internal diameter greater than the internal diameter of said first nozzle, said nozzle cavity being bounded at a proximal end by said first nozzle and at a distal end by an annular shoulder seal defining an internal circumference of said nozzle cavity, such that said shoulder seal of said second nozzle creates a seal with a neck ring of the preform when said first nozzle is disposed in contact with the mouth of said preform.

16. The injection head as claimed in claim 15, further comprising a channel establishing fluid communication between the nozzle cavity and a source of pressurized compensation fluid.

17. An ensemble for fabricating a container, the ensemble comprising an injection head and a preform, the preform having a substantially tubular body closed on one end, having a mouth defined by portions of the preform disposed on another end and defining a preform cavity therein, the injection head having a first nozzle configured to establish a fluid tight engagement with the preform, the first nozzle further including a substantially tubular spout configured to be inserted into the mouth of the preform and creating a circumferential and axial seal therewith, the tubular spout having a sealing length greater than a width of the portions defining the mouth of said preform.

* * * * *